(12) United States Patent
Nilsson et al.

(10) Patent No.: US 12,381,669 B2
(45) Date of Patent: Aug. 5, 2025

(54) SIGNALING SUPPORT FOR ENHANCED FREQUENCY HOPPING FOR AP SRS

(71) Applicant: Telefonaktiebolaget LM Ericsson (publ), Stockholm (SE)

(72) Inventors: Andreas Nilsson, Gothenburg (SE); Mattias Frenne, Uppsala (SE); Sven Jacobsson, Västra Frölunda (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 294 days.

(21) Appl. No.: 17/922,172

(22) PCT Filed: May 14, 2021

(86) PCT No.: PCT/IB2021/054168
§ 371 (c)(1),
(2) Date: Oct. 28, 2022

(87) PCT Pub. No.: WO2021/229537
PCT Pub. Date: Nov. 18, 2021

(65) Prior Publication Data
US 2023/0179347 A1    Jun. 8, 2023

Related U.S. Application Data

(60) Provisional application No. 63/025,441, filed on May 15, 2020.

(51) Int. Cl.
*H04L 5/00* (2006.01)
(52) U.S. Cl.
CPC .......... *H04L 5/0012* (2013.01); *H04L 5/0051* (2013.01)

(58) Field of Classification Search
CPC ... H04L 5/0012; H04L 5/0051; H04L 5/0048; H04L 5/0007; H04L 5/0005; H04L 5/0094; H04L 27/2613; H04L 1/00; H04B 1/713
See application file for complete search history.

(56) References Cited

U.S. PATENT DOCUMENTS

| 11,317,400 B2 | 4/2022 | Yokomakura et al. |
| 2011/0199944 A1* | 8/2011 | Chen ..................... H04W 72/23 370/280 |

(Continued)

FOREIGN PATENT DOCUMENTS

| EP | 3471327 A1 | 4/2019 |
| EP | 3780807 A1 | 2/2021 |

(Continued)

OTHER PUBLICATIONS

International Search Report and Written Opinion dated Jul. 21, 2021 for International Application No. PCT/IB2021/054168 filed May 14, 2021, consisting of 10-pages.

(Continued)

*Primary Examiner* — Brian T Le
(74) *Attorney, Agent, or Firm* — Weisberg I.P. Law, P.A.

(57) ABSTRACT

A method, system and apparatus are disclosed. According to one or more embodiments, a network node configured to communicate with a wireless device is provided. The network node includes processing circuitry configured to: trigger a first aperiodic, AP, reference signal transmission using a reference signal trigger state; and trigger a second AP reference signal transmission using the reference signal trigger state associated with the first AP reference signal transmission, the second AP reference signal transmission is configured to use at least one different frequency resource than the first AP reference signal transmission.

16 Claims, 13 Drawing Sheets

(56) References Cited

U.S. PATENT DOCUMENTS

2013/0058306 A1* 3/2013 Noh .............. H04L 5/0048
370/329
2019/0190669 A1* 6/2019 Park .............. H04W 72/21

FOREIGN PATENT DOCUMENTS

| WO | 2011100466 A2 | 8/2011 |
| WO | 2019189751 A1 | 10/2019 |

OTHER PUBLICATIONS

ETSI TS 138 211 V15.8.0; 5G; NR; Physical channels and modulation (3GPP TS 38.211 version 15.8.0 Release 15), Jan. 2020, consisting of 100-pages.

3GPP TSG RAN WG1 Meeting #98 R1-1908719; Title: Discussion of additional SRS symbols; Agenda item: 6.2.3.1.1; Source: Lenovo, Motorola Mobility; Document for: Discussion; Date and Location: Aug. 26-30, 2019, Prague, CZ, consisting of 8-pages.

3GPP TS 38.331 V15.8.0; 3rd Generation Partnership Project; Technical Specification Group Radio Access Network: NR; Radio Resource Control (RRC) protocol specification (Release 15), Dec. 2019, consisting of 532-pages.

3GPP TS 38.214 V15.8.0; 3rd Generation Partnership Project; Technical Specification Group Radio Access Network: NR; Physical layer procedures for data (Release 15), Dec. 2019, consisting of 106-pages.

3GPP TS 38.213 V15.8.0; 3rd Generation Partnership Project; Technical Specification Group Radio Access Network: NR; Physical layer procedures for control (Release 15), Dec. 2019, consisting of 109-pages.

* cited by examiner

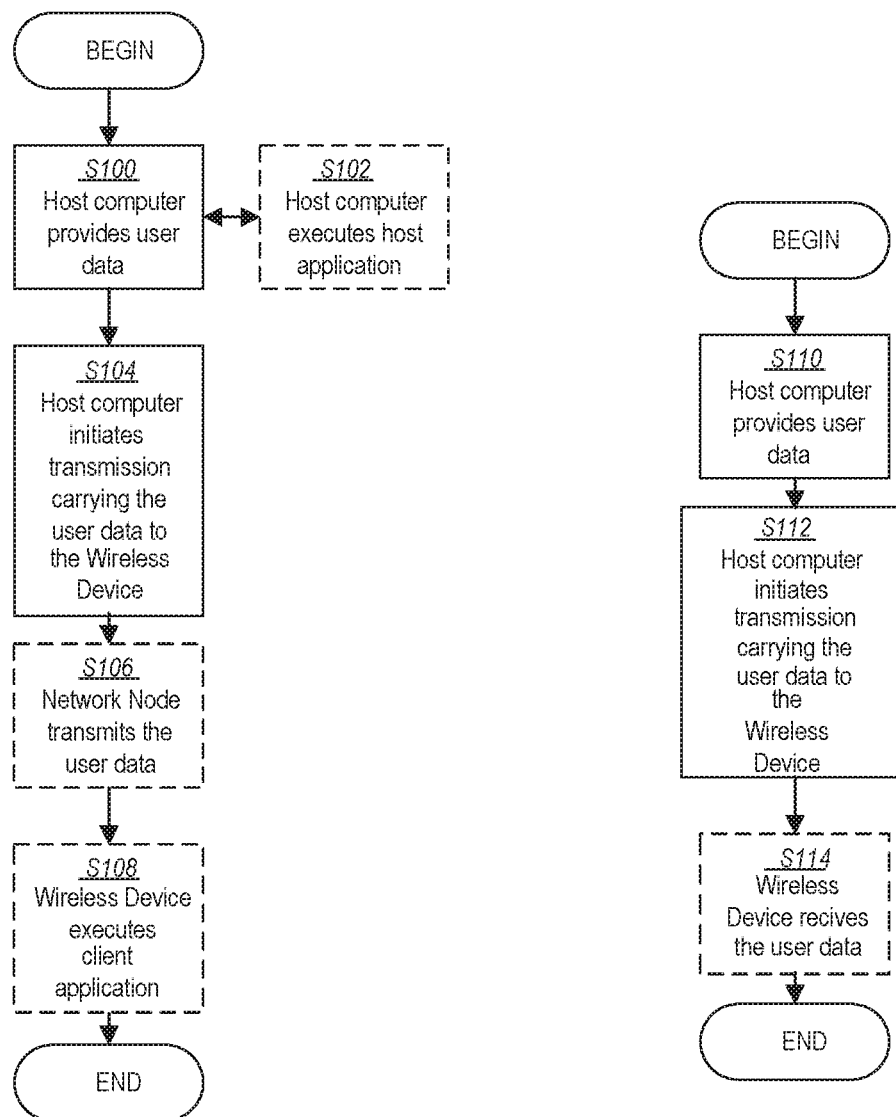

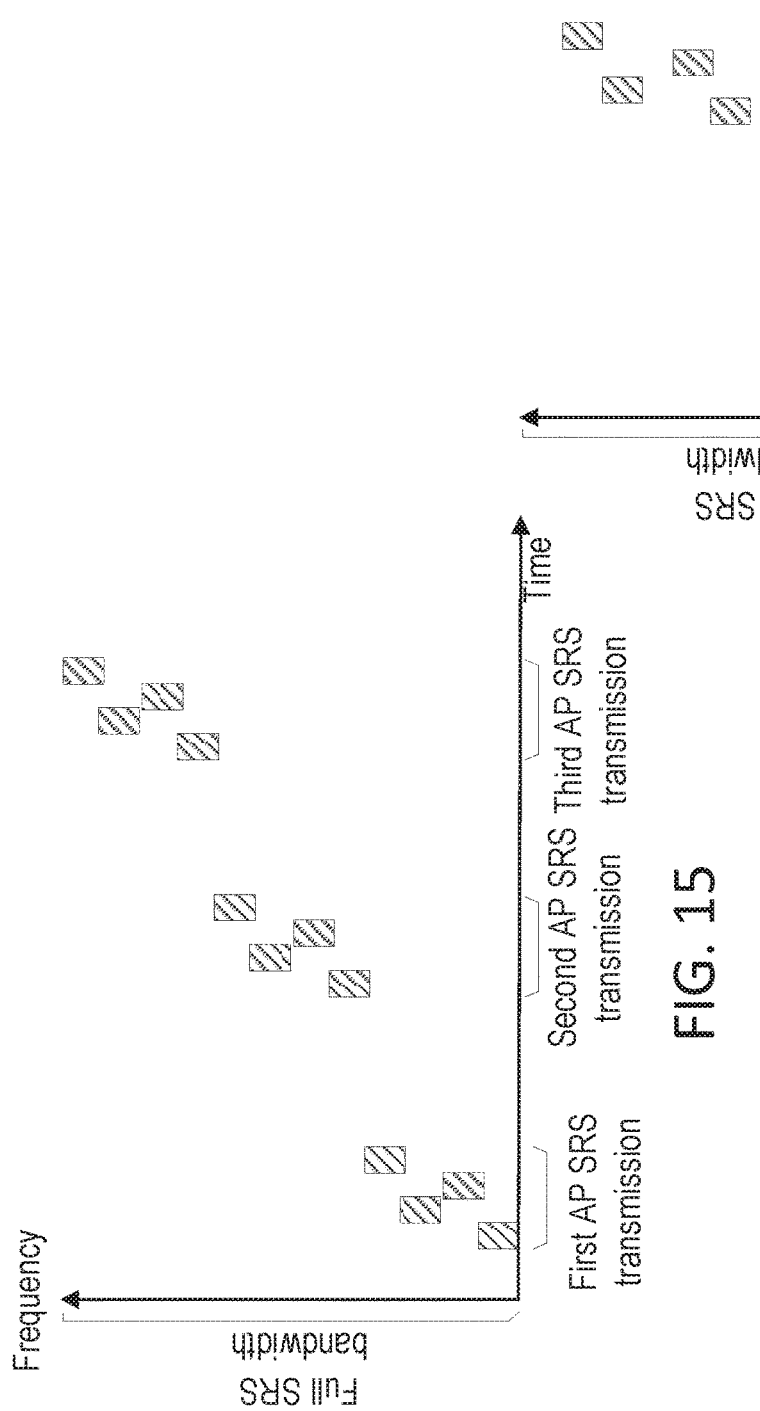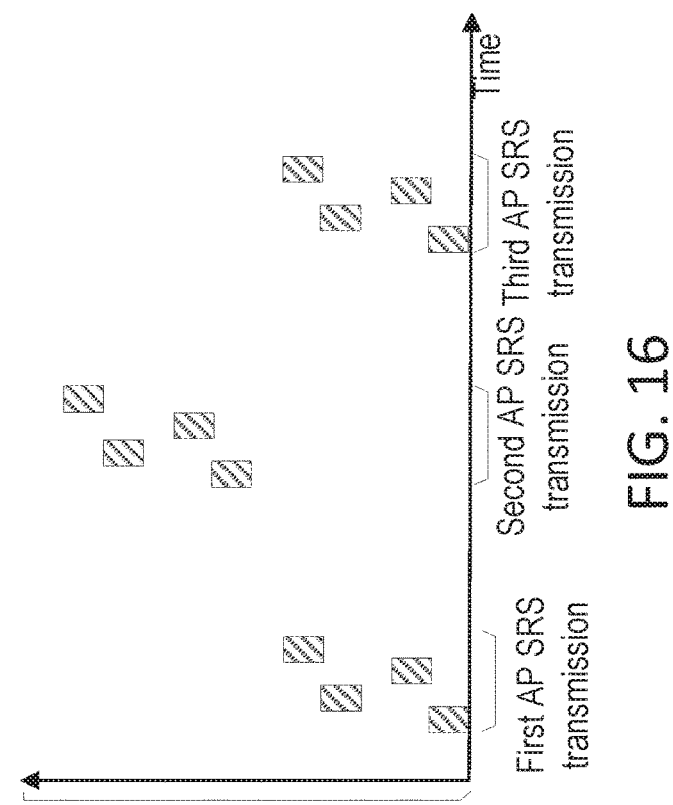
FIG. 15
FIG. 16

FIG. 19

SIGNALING SUPPORT FOR ENHANCED FREQUENCY HOPPING FOR AP SRS

CROSS-REFERENCE TO RELATED APPLICATIONS

This application is a Submission Under 35 U.S.C. § 371 for U.S. National Stage Patent Application of International Application No.: PCT/IB2021/054168, filed May 14, 2021 entitled "SIGNALING SUPPORT FOR ENHANCED FREQUENCY HOPPING FOR AP SRS," which claims priority to U. S. Provisional Application No.: 63/025,441, filed May 15, 2020, entitled "SIGNALING SUPPORT FOR ENHANCED FREQUENCY HOPPING FOR AP SRS," the entireties of both of which are incorporated herein by reference.

TECHNICAL FIELD

The present disclosure relates to wireless communications, and in particular, to frequency allocation for aperiodic (AP) sounding reference signal (SRS) resources triggered by an AP trigger state.

BACKGROUND

The sounding reference signal (SRS) is used in Third Generation Partnership Project (3GPP) systems such as Long Term Evolution (LTE) and New Radio (NR) (also known as 5G) to estimate the channel in the uplink (UL). The application for the SRS is mainly to provide a pilot signal to evaluate the channel quality in order to, e.g., derive the appropriate transmission/reception beams or to perform link adaptation (i.e., setting the modulation and coding scheme (MCS) and the multiple-input multiple-output (MIMO) precoder) for physical uplink shared channel (PUSCH) transmission. The SRS is functionality similar to the downlink (DL) channel-state information reference signal (CSI-RS), which provides similar beam management and link adaptation functions in the DL.

In LTE and NR, the SRS signal is configured via radio resource control (RRC), and some parts of the configuration can be updated by medium access control (MAC) control element (CE) signaling (to avoid using RRC, which is slower than MAC CE). The configuration includes the SRS resource allocation (the physical resource and sequences to use) as well as the aperiodic/periodic/semi-persistent behavior. For aperiodic SRS transmission, the RRC configuration does not activate an SRS transmission from the wireless device, but instead a dynamic activation trigger is transmitted via the physical downlink control channel (PDCCH)'s downlink control information (DCI) in the DL from the network node to order the wireless device to transmit the SRS once, at a predetermined time.

SRS Configuration

The SRS configuration allows for the generation of an SRS transmission pattern based on an SRS resource configuration grouped into SRS resource sets. Each SRS resource is configured with the following abstract syntax notation (ASN) code in RRC as described in wireless communication standards such as 3GPP Technical Specification (TS) 38.331 version 15.8, and as illustrated below:

```
SRS-Resource ::=                    SEQUENCE {
  srs-ResourceId                      SRS-ResourceId,
  nrofSRS-Ports                       ENUMERATED {port1, ports2, ports4},
  ptrs-PortIndex                      ENUMERATED {n0, n1 }
OPTIONAL,   -- Need R
  transmissionComb                      CHOICE {
    n2                                  SEQUENCE {
      combOffset-n2                       INTEGER (0..1),
      cyclicShift-n2                      INTEGER (0..7)
    },
    n4                                  SEQUENCE {
      combOffset-n4                       INTEGER (0..3),
      cyclicShift-n4                      INTEGER (0..11)
    }
  },
  resourceMapping                     SEQUENCE {
    startPosition                       INTEGER (0..5),
    nrofSymbols                         ENUMERATED {n1, n2, n4},
    repetitionFactor                    ENUMERATED {n1, n2, n4}
  },
  freqDomainPosition                    INTEGER (0..67),
  freqDomainShift                       INTEGER (0..268),
  freqHopping                         SEQUENCE {
    c-SRS                               INTEGER (0..63),
    b-SRS                               INTEGER (0..3),
    b-hop                               INTEGER (0..3)
  },
  groupOrSequenceHopping              ENUMERATED { neither, groupHopping,
sequenceHopping },
  resourceType                          CHOICE {
    aperiodic                           SEQUENCE {
      ...
    },
    semi-persistent                     SEQUENCE {
      periodicityAndOffset-sp             SRS-PeriodicityAndOffset,
      ...
    },
    periodic                            SEQUENCE {
      periodicityAndOffset-p              SRS-PeriodicityAndOffset,
      ...
    }
}
```

```
},
    sequenceId              INTEGER (0..1023),
    spatialRelationInfo         SRS-SpatialRelationInfo     OPTIONAL,
-- Need R
    ...
}
```

To create the SRS resource on the time-frequency grid with the current RRC configuration, each SRS resource is thus configurable with respect to:

The transmission comb (i.e., mapping to every $n^{th}$ subcarrier, where n=2 or n=4), configured by the RRC parameter transmissionComb.
    For each SRS resource, a comb offset, configured by the RRC parameter combOffset, is specified (i.e., which of the n combs to use).
    A cyclic shift, configured by the RRC parameter cyclicShift, of the SRS sequence that maps to the assigned comb is also specified. The cyclic shift increases the number of SRS resources that can be mapped to a comb, but there may be a limit on how many cyclic shifts that can be used that depend on the transmission comb being used.
  The time-domain position of an SRS resource within a given slot is configured with the RRC parameter resourceMapping.
    A time-domain start position for the SRS resource, which is limited to be one of the last 6 symbols in a slot, is configured by the RRC parameter startPosition.
    A number of orthogonal frequency-division multiplexing (OFDM) symbols for the SRS resource (that can be set to 1, 2 or 4) is configured by the RRC parameter nrofSymbols.
    A repetition factor (that can be set to 1, 2 or 4) configured by the RRC parameter repetitionFactor. When this parameter is larger than 1, the same frequency resources are used multiple times across OFDM symbols, to improve the coverage as more energy is collected by the receiver. It can also be used for beam-management functionality, where the network node can probe different receive beams for each repetition.
  The frequency-domain sounding bandwidth and position of an SRS resource in a given OFDM symbol (i.e., which part of the system bandwidth is occupied by the SRS resource) is configured with the RRC parameters freqDomainPosition, freqDomainShift and the freqHopping parameters: c-SRS, b-SRS and b-hop. The smallest possible sounding bandwidth in a given OFDM symbol may be 4 resource blocks (RBs).

An example of a schematic description of how an SRS resource may be allocated in time and frequency in a given OFDM symbol within a slot is provided in FIG. 1. In particular, c-SRS controls the maximum sounding bandwidth, which can be smaller than the maximum transmission bandwidth the wireless device supports. For example, the wireless device may have capability to transmit over 40 MHz bandwidth, but c-SRS is set to a smaller value corresponding to 5 MHz, thereby focusing the available transmit power to a narrowband transmission which improves the SRS coverage.

Since the frequency-domain sounding bandwidth of an SRS resource set is configured using RRC signaling, it is cumbersome to change the frequency-domain sounding bandwidth of an SRS resource set. With existing standards, it is however possible to configure a wireless device with multiple SRS resource sets where the different SRS resource sets are configured with different frequency-domain sounding bandwidths. The network node can then trigger transmission of a specific SRS resource set depending on the desired frequency-domain sounding bandwidth. However, since there are strict limits of the number of configurable SRS resource sets for each usage, the potential for this solution is very limited. For example, a maximum of one SRS resource set with usage 'codebook' or 'nonCodebook' is allowed, a maximum two SRS resource sets with usage 'antennaSwitching' is allowed, and SRS resource set with usage 'beamManagement' is only mandatory for wireless devices not supporting beam correspondence and is only applicable for FR2 frequencies.

The RRC parameter resourceType configures whether the resource is transmitted as periodic, aperiodic (singe transmission triggered by DCI), or semi persistent (same as periodic but the start and stop of the periodic transmission is controlled by MAC CE signaling instead of RRC signaling). The RRC parameter sequenceId specifies how the SRS sequence is initialized and the RRC parameter spatialRelationInfo configures the spatial relation for the SRS beam with respect to a reference signal (RS) which can be either another SRS, synchronization signal block (SSB) or CSI-RS. Hence, if the SRS has a spatial relation to another SRS, then this SRS should be transmitted with the same beam (i.e., spatial transmit filter) as the indicated SRS.

The SRS resource may be configured as part of an SRS resource set. Within a SRS resource set, the following parameters (common to all resources in the set) may be configured in RRC:

The associated CSI-RS resource (this configuration is only applicable for non-codebook-based UL transmission) for each of the possible resource types (aperiodic, periodic and semi persistent). For aperiodic SRS, the associated CSI-RS resource is set by the RRC parameter csi-RS. For periodic and semi-persistent SRS, the associated CSI-RS resource is set by the RRC parameter associatedCSI-RS. Note that all resources in a resource set must share the same resource type.
  For aperiodic resources, the slot offset is configured by the RRC parameter slotOffset and sets the delay from the PDCCH trigger reception to start the transmission of the SRS resources measured in slots.
  The resource usage, which is configured by the RRC parameter usage sets the constraints and assumption on the resource properties as described in wireless communication standards such as 3GPP TS 38.214.
  The power-control RRC parameters alpha, p0, pathlossReferenceRS (indicating the downlink RS that can be used for path loss estimation) and srs-PowerControlAdjustmentStates, may be used to determine the SRS transmit power.

Each SRS resource set is configured with the following ASN code in RRC as described in wireless communication standards such as 3GPP TS 38.331 version 15.8, and as illustrated below:

```
SRS-ResourceSet ::=         SEQUENCE {
    srs-ResourceSetId           SRS-ResourceSetId,
    srs-ResourceIdList          SEQUENCE (SIZE(1..maxNrofSRS-ResourcesPerSet))
OF SRS-ResourceId   OPTIONAL, -- Cond Setup
    resourceType                CHOICE {
        aperiodic                   SEQUENCE {
            aperiodicSRS-ResourceTrigger     INTEGER (1..maxNrofSRS-TriggerStates-1),
            csi-RS                  NZP-CSI-RS-ResourceId       OPTIONAL,
-- Cond NonCodebook
            slotOffset              INTEGER (1..32)             OPTIONAL, --
Need S
            ...,
            [[
            aperiodicSRS-ResourceTriggerList-v1530   SEQUENCE (SIZE(1..maxNrofSRS-
TriggerStates-2))
                                    OF INTEGER (1..maxNrofSRS-TriggerStates-1)
OPTIONAL -- Need M
            ]]
        },
        semi-persistent             SEQUENCE {
            associatedCSI-RS        NZP-CSI-RS-ResourceId
OPTIONAL, -- Cond NonCodebook
            ...
        },
        periodic                    SEQUENCE {
            associatedCSI-RS        NZP-CSI-RS-ResourceId
OPTIONAL, -- Cond NonCodebook
            ...
        }
    },
    usage                       ENUMERATED {beamManagement, codebook,
nonCodebook, antennaSwitching},
    alpha                       Alpha                       OPTIONAL, -- Need S
    p0                          INTEGER (-202..24)          OPTIONAL, --
Cond Setup
    pathlossReferenceRS         CHOICE {
        ssb-Index               SSB-Index,
        csi-RS-Index            NZP-CSI-RS-ResourceId
    }                                                       OPTIONAL, -- Need M
    srs-PowerControlAdjustmentStates     ENUMERATED { sameAsFci2,
separateClosedLoop}     OPTIONAL, -- Need S
    ...
}
```

Hence, in terms of resource allocation, the resource set configures resource usage, power control, aperiodic transmission timing, and DL resource association. The resource configuration controls the time-and-frequency allocation, the periodicity and offset of each resource, the sequence ID for each resource and the spatial relation information.

Resource Mapping to Antenna Ports

In some embodiments, SRS resources can be configured with four different usages, 'beamManagement', 'codebook', 'nonCodebook' or 'antennaSwitching'.

SRS resources in an SRS resource set configured with usage 'beamManagement' are mainly applicable for frequency bands above 6 GHz (i.e., for frequency range 2 (FR2)) and the purpose is to allow the wireless device to evaluate different wireless device transmit beams for wideband (e.g., analog) beamforming arrays. The wireless device may then transmit one SRS resource per wideband beam, and the network node may perform reference signal received power (RSRP) measurement on each of the transmitted SRS resources and in this way determine a suitable wireless device transmit beam. The network node can then inform the wireless device which transmit beam to use by updating the spatial relation for different UL RSs, for more info about spatial relations. The network node may configure the wireless device with one SRS resource set with usage 'beamManagement' for each analog array (panel) that the wireless device has. In NR 3GPP Release 15, it is up to wireless device implementation as to how to associate the SRS resource set with usage 'beamManagement' to the different wireless device panels, however it is discussed in 3GPP to have a fixed mapping between a certain wireless device panel and a certain SRS resource set, so that the network node can get more control of how the wireless device uses the different wireless device panels. Also, each SRS resource in the set may contain either one or two SRS ports depending on if the analog panel has one or two polarizations.

SRS resources in an SRS resource set configured with usage 'codebook' are used to sound the different wireless device antennas and to let the network node determine suitable precoders, rank and MCS for an upcoming uplink (UL) transmission from the wireless device. How each SRS port is mapped to each wireless device antenna is up to the wireless device implementation, but one SRS port may be transmitted per wireless device antenna, i.e., the SRS port to antenna-port mapping may be an identity matrix.

SRS resources in an SRS resource set configured with usage 'nonCodebook' are used to sound different potential precoders, autonomously determined by the wireless device. The wireless device may determine a set of candidate precoders based on reciprocity, transmit one SRS resource per candidate precoder, and the network node can then select which precoders the wireless device should use for upcoming PUSCH transmissions. One uplink (UL) layer may be transmitted per indicated candidate precoder. How the wireless device maps the SRS resources to the antenna ports is determined by wireless device implementation and may depend on the channel realization.

SRS resources in an SRS resource set configured with usage 'antennaSwitching' are used to sound the channel in the UL so that the network node can use reciprocity to determine suitable DL precoders. If the wireless device has the same number of transmit and receive chains, the wireless device is expected to transmit one SRS port per wireless device 22 antenna. The mapping from SRS ports to antenna ports is, however, for the wireless device to decide and is transparent to the network node.

In NR 3GPP Release 16, a new usage for SRS, 'positioning', was agreed to for handling the case of SRS used for positioning. Within this usage, an SRS resource may be configured with a comb-based pattern that is more flexible than the one available in NR 3GPP Release 15. One limitation with the positioning SRS is that only single-port transmission is supported, which means that each triggered SRS set can only be used to sound one single wireless device antenna.

SRS Coverage

Uplink coverage for SRS is identified as a bottleneck for NR 3GPP standards and a limiting factor for DL reciprocity-based operation. Some measures to improve the coverage of SRS have been adopted in NR 3GPP. For example, repetition of an SRS resource and/or frequency hopping has been adopted. One example of frequency hopping is illustrated in the left graph of FIG. 2, where different parts of the frequency band are sounded in different OFDM symbols, which means that the power spectral density (PSD) for the SRS transmission may improve. Here, the illustrated frequency-hopping pattern is set according to existing wireless communication standards such as Section 6.4.1.4.3 of 3GPP TS 38.211 version 15.8. The frequency hopping can be triggered using DCI and a certain SRS trigger state. The right graph of FIG. 2 illustrates an example of repetition, where one SRS resource is transmitted in four consecutive OFDM symbols, which will increase the processing gain of the SRS as, for example, the same SRS transmission is repeated.

SRS Power Scaling

SRS has its own UL power control (PC) scheme in NR 3GPP, which can be found in existing wireless communication standards such as in Section 7.3 in 3GPP TS 38.213. The SRS output power ($P_{SRS}$) the wireless device should use for a given SRS transmission is given by the formula:

$$P_{SRS,b,f,c}(i, q_s, l) = \min\begin{cases} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_s) + h_{b,f,c}(i, l) \end{cases}$$

Some existing wireless communication standards such as Section 7.3 in 3GPP TS 38.213 additionally specifies how the wireless device should split the above output power, $P_{SRS}$, between two-or-more different SRS ports transmitted during one SRS transmit occasion. An SRS transmit occasion is a time window within a slot where SRS transmission is performed: For SRS, a wireless device splits a linear value $\hat{P}_{SRS,b,f,c}(i, q_s, l)$ of the transmit power $P_{SRS,b,f,c}(i, q_s, l)$ on active UL BWP b of carrier f of serving cell c equally across the configured antenna ports for SRS.

SRS Time Bundling

SRS time bundling refers to arrangements where multiple SRS transmissions are performed by a wireless device at different time slots, and that the receiver (e.g., the network node) can combine the multiple SRS transmissions in different ways in order to improve the quality of the channel state information (CSI) at the network node. The phase (and potentially also the amplitude) of the wireless device transmit chains at the occasions of the different SRS transmissions can experience different levels of coherency (i.e., different levels of phase and amplitude similarity).

However, AP SRS with frequency hopping is not without issues as, in some cases, the number of OFDM symbols for which the frequency hopping is carried out (or the bandwidth of the transmission of each hop) is insufficient to cover the whole SRS bandwidth, since some parts of the SRS bandwidth will not be sounded. Hence, one or several additional SRS trigger states may need to be configured to cover the remaining SRS bandwidth, which is an issue as it complicates the configuration and consumes two (or more) trigger states.

SUMMARY

Some embodiments advantageously provide methods, systems, and apparatuses for frequency allocation for AP SRS resources triggered by an AP trigger state.

The network node triggers a first AP SRS transmission using an SRS trigger state in the DCI, configured with frequency hopping across multiple OFDM symbols. The network node then triggers a second AP SRS transmission using an SRS trigger state in the DCI, in which case the same SRS trigger state as in the first AP SRS transmission is indicated, then the second AP SRS transmission does not start at the same RB as the first AP SRS transmission.

Furthermore, the second AP SRS transmission may in one example continue where the first AP SRS transmission ended, in order to allow sounding of the full SRS bandwidth using a same SRS trigger state.

The same principle applies for the following (third, fourth, . . . n) AP SRS transmissions (i.e., use of the same trigger state), in case two triggers is insufficient to allow covering the full SRS bandwidth.

When the full SRS bandwidth has been sounded by one or multiple triggers using the same SRS trigger state, the wireless device starts over from the first RBs again, i.e., the procedure is reset (in a similar manner that is performed for periodic SRS transmission with frequency hopping.

According to one aspect of the disclosure, a network node configured to communicate with a wireless device is provided. The network node includes processing circuitry configured to: trigger a first aperiodic, AP, reference signal transmission using a reference signal trigger state, and trigger a second AP reference signal transmission using the reference signal trigger state associated with the first AP reference signal transmission where the second AP reference signal transmission is configured to use at least one different frequency resource than the first AP reference signal transmission.

According to one or more embodiments of this aspect, the second AP reference signal transmission is configured to start at a different frequency resource than a start of the first AP reference signal transmission. According to one or more embodiments of this aspect, the second AP reference signal transmission is configured to use frequency resources that are contiguous with a frequency resources used for the first AP reference signal transmission. According to one or more embodiments of this aspect, the second AP reference signal transmission is configured to use at least one frequency resources that is used by the first AP reference signal transmission.

According to one or more embodiments of this aspect, the reference signal trigger state associated with at least the first and second AP reference signal transmissions is configured to use an entire preconfigured SRS bandwidth. According to one or more embodiments of this aspect, respective frequency resources used by the first AP reference signal transmission and the second AP reference signal transmission are configured based at least on a frequency hopping equation that includes a frequency offset relative to a previous transmission. According to one or more embodiments of this aspect, the first and second AP reference signal transmission are configured on one of: respective non-contiguous frequency resources; and respective contiguous frequency resource.

According to one or more embodiments of this aspect, the first AP reference signal transmission and the second AP signal transmission are trigger by respective downlink control information, DCI, signaling. According to one or more embodiments of this aspect, the triggering of the first and second AP reference signal transmission is based at least on radio resource control, RRC, signaling indicating a frequency hopping scheme for the first and second AP reference signal transmissions.

According to another aspect of the present disclosure, a wireless device configured to communicate with a network node is provided. The wireless device includes processing circuitry configured to: cause transmission of a first aperiodic, AP, reference signal transmission using a reference signal trigger state; and cause transmission of a second AP reference signal transmission using the reference signal trigger state associated with the first AP reference signal transmission where the second AP reference signal transmission is configured to use at least one different frequency resource than the first AP reference signal transmission.

According to one or more embodiments of this aspect, the second AP reference signal transmission is configured to start at a different frequency resource than a start of the first AP reference signal transmission. According to one or more embodiments of this aspect, the second AP reference signal transmission is configured to use frequency resources that are contiguous with a frequency resources used for the first AP reference signal transmission. According to one or more embodiments of this aspect, the second AP reference signal transmission is configured to use at least one frequency resources that is used by the first AP reference signal transmission.

According to one or more embodiments of this aspect, the reference signal trigger state associated with at least the first and second AP reference signal transmissions is configured to use an entire preconfigured SRS bandwidth. According to one or more embodiments of this aspect, respective frequency resources used by the first AP reference signal transmission and the second AP reference signal transmission are configured based at least on a frequency hopping equation that includes a frequency offset relative to a previous transmission. According to one or more embodiments of this aspect, the first and second AP reference signal transmission are configured on one of: respective non-contiguous frequency resources; and respective contiguous frequency resource.

According to one or more embodiments of this aspect, the processing circuitry is further configured to receive a plurality instances of downlink control information, DCI, signaling, each instance of DCI signaling configured to trigger a respective AP signal transmission. According to one or more embodiments of this aspect, the processing circuitry is further configured to receive radio resource control, RRC, signaling indicating a frequency hopping scheme for the first and second AP reference signal transmissions.

According to another aspect of the present disclosure, a method implemented by a network node that is configured to communicate with a wireless device is provided.

A first aperiodic, AP, reference signal transmission using a reference signal trigger state is triggered. A second AP reference signal transmission using the reference signal trigger state associated with the first AP reference signal transmission is triggered where the second AP reference signal transmission is configured to use at least one different frequency resource than the first AP reference signal transmission.

According to one or more embodiments of this aspect, the second AP reference signal transmission is configured to start at a different frequency resource than a start of the first AP reference signal transmission. According to one or more embodiments of this aspect, the second AP reference signal transmission is configured to use frequency resources that are contiguous with a frequency resources used for the first AP reference signal transmission. According to one or more embodiments of this aspect, the second AP reference signal transmission is configured to use at least one frequency resources that is used by the first AP reference signal transmission.

According to one or more embodiments of this aspect, the reference signal trigger state associated with at least the first and second AP reference signal transmissions is configured to use an entire preconfigured SRS bandwidth. According to one or more embodiments of this aspect, respective frequency resources used by the first AP reference signal transmission and the second AP reference signal transmission are configured based at least on a frequency hopping equation that includes a frequency offset relative to a previous transmission. According to one or more embodiments of this aspect, the first and second AP reference signal transmission are configured on one of: respective non-contiguous frequency resources; and respective contiguous frequency resource.

According to one or more embodiments of this aspect, the first AP reference signal transmission and the second AP signal transmission are trigger by respective downlink control information, DCI, signaling. According to one or more embodiments of this aspect, the triggering of the first and second AP reference signal transmission is based at least on radio resource control, RRC, signaling indicating a frequency hopping scheme for the first and second AP reference signal transmissions.

According to another aspect of the present disclosure, a method implemented by a wireless device that is configured to communicate with a network node is provided. Transmission of a first aperiodic, AP, reference signal transmission using a reference signal trigger state is caused. Transmission of a second AP reference signal transmission using the reference signal trigger state associated with the first AP reference signal transmission is caused where the second AP reference signal transmission is configured to use at least one different frequency resource than the first AP reference signal transmission.

According to one or more embodiments of this aspect, the second AP reference signal transmission is configured to start at a different frequency resource than a start of the first AP reference signal transmission. According to one or more embodiments of this aspect, the second AP reference signal transmission is configured to use frequency resources that are contiguous with a frequency resources used for the first AP reference signal transmission. According to one or more embodiments of this aspect, the second AP reference signal transmission is configured to use at least one frequency resources that is used by the first AP reference signal transmission.

According to one or more embodiments of this aspect, the reference signal trigger state associated with at least the first and second AP reference signal transmissions is configured to use an entire preconfigured SRS bandwidth. According to one or more embodiments of this aspect, respective frequency resources used by the first AP reference signal transmission and the second AP reference signal transmission are configured based at least on a frequency hopping equation that includes a frequency offset relative to a previous transmission. According to one or more embodiments of this aspect, the first and second AP reference signal transmission are configured on one of: respective non-contiguous frequency resources; and respective contiguous frequency resource.

According to one or more embodiments of this aspect, a plurality instances of downlink control information, DCI, signaling is received where each instance of DCI signaling is configured to trigger a respective AP signal transmission. According to one or more embodiments of this aspect, radio resource control, RRC, signaling indicating a frequency hopping scheme for the first and second AP reference signal transmissions is received.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart illustrating example methods implemented in a communication system including a host computer, a network node and a wireless device for executing a client application at a wireless device according to some embodiments of the present disclosure;

FIG. 6 is a flowchart illustrating example methods implemented in a communication system including a host computer, a network node and a wireless device for receiving user data at a wireless device according to some embodiments of the present disclosure;

FIG. 15 is a diagram of an example of continued transmission according to some embodiments of the present disclosure;

FIG. 16 is a diagram of another example of continued transmission according to some embodiments of the present disclosure;

FIG. 19 is a diagram of an AP SRS set that is RRC configured with an additional bit field according to some embodiments of the present disclosure.

DETAILED DESCRIPTION

Figure 1:
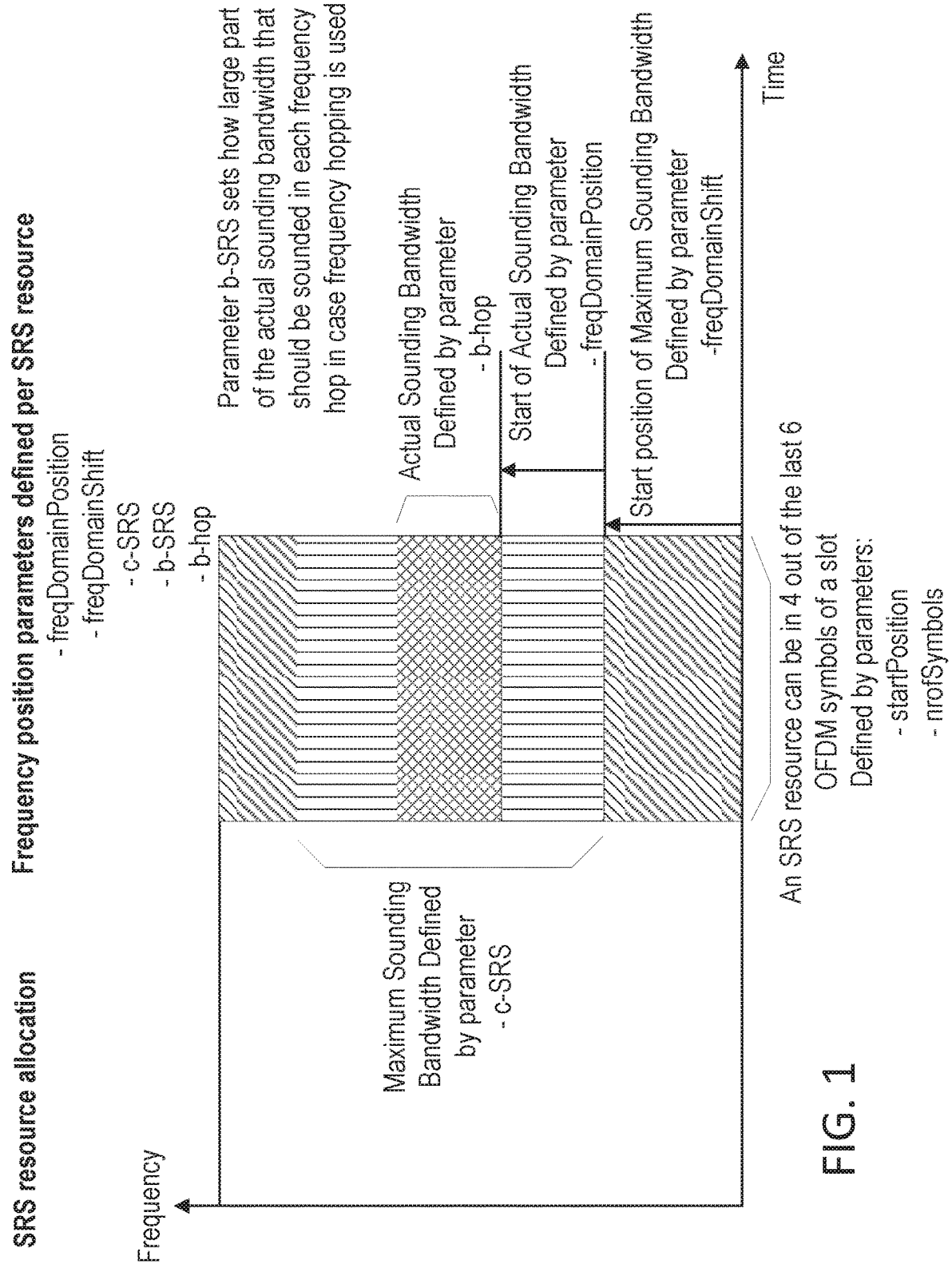
FIG. 1 is a diagram of SRS resource allocation in time and frequency for an SRS resource in an OFDM symbol within a slot.
Figure 2:
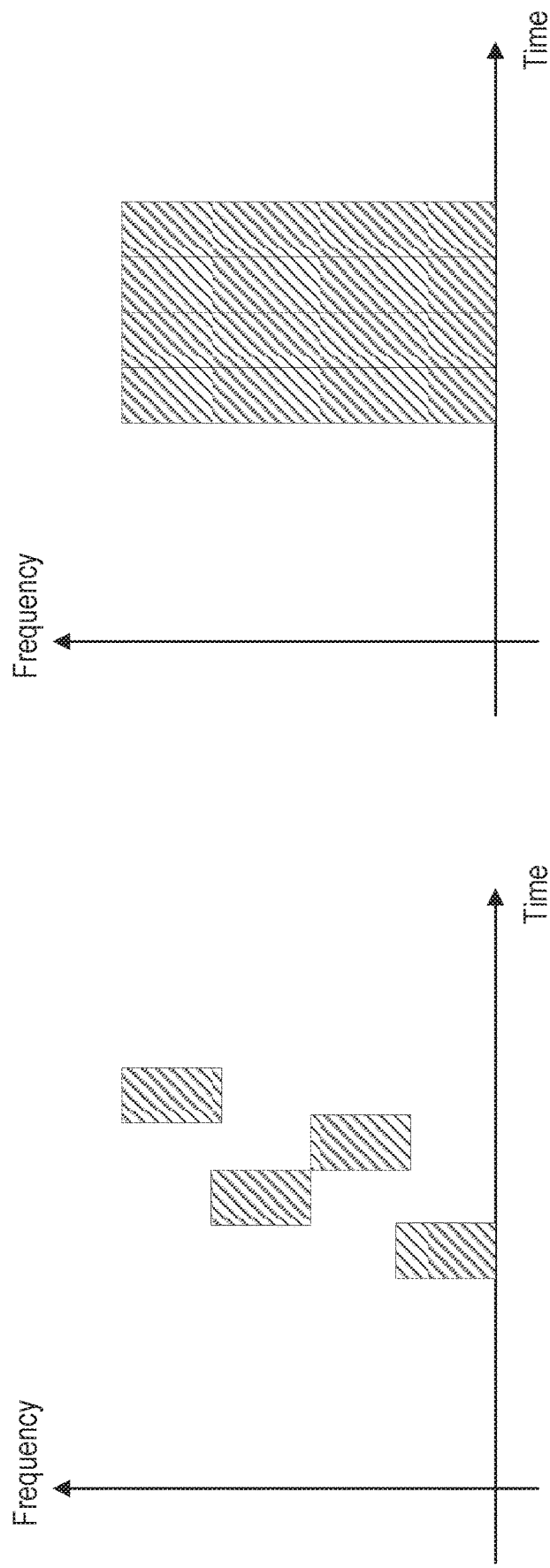
FIG. 2 is a diagram of a comparison between SRS transmission using frequency hopping and repetition.

Before describing in detail exemplary embodiments, it is noted that the embodiments reside primarily in combinations of apparatus components and processing steps related to frequency allocation for AP SRS resources triggered by an AP trigger state. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g., for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode and/or SRS transmission configuration such as an offset. A terminal or wireless device or node may be adapted to configure itself, e.g., according to information or data in a memory of the terminal or wireless device. Configuring a node or terminal or wireless device by another device or node or a network may refer to and/or comprise transmitting information and/or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 3:
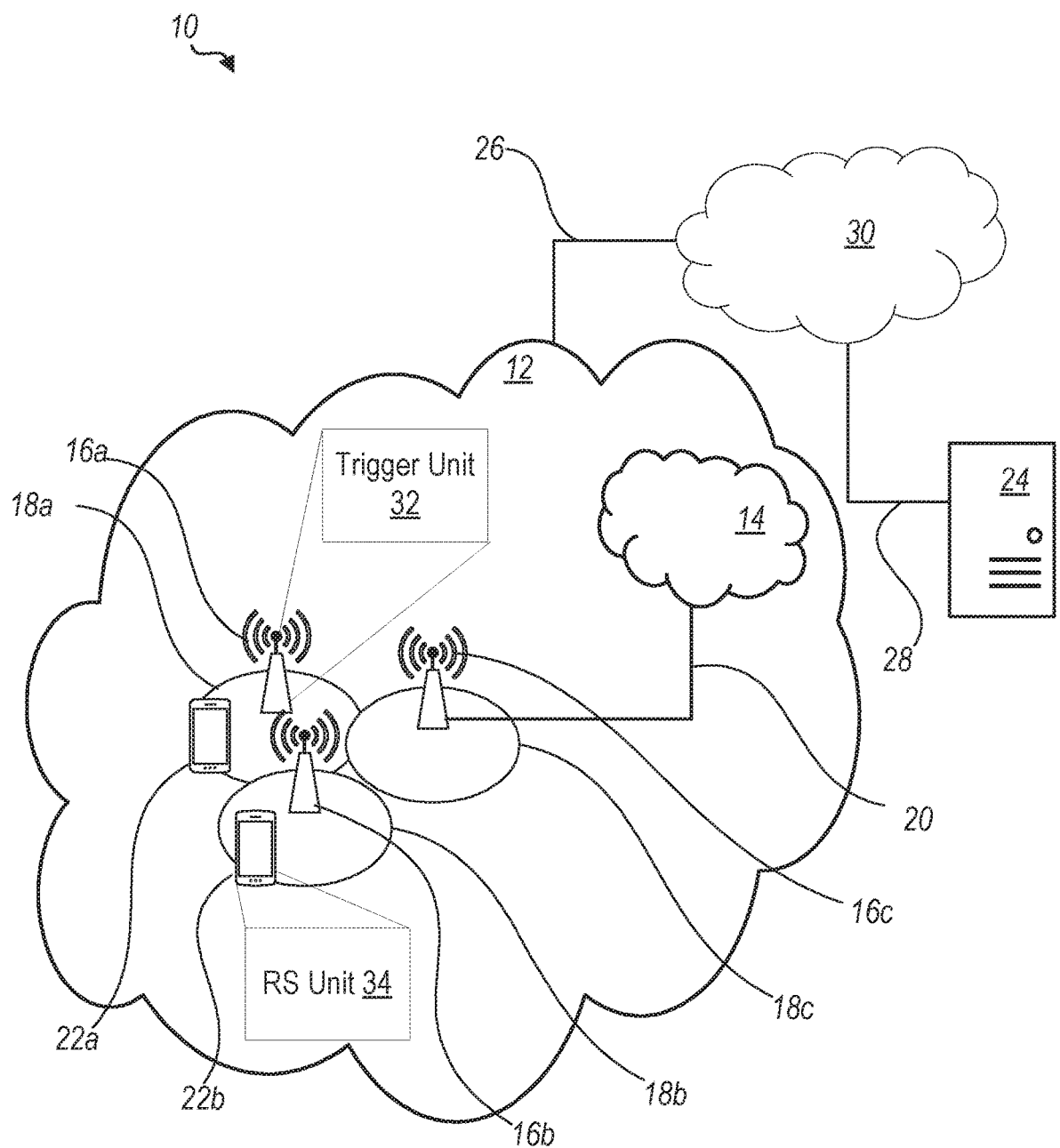
FIG. 3 is a schematic diagram of an example network architecture illustrating a communication system connected via an intermediate network to a host computer according to the principles in the present disclosure.

Embodiments provide for frequency allocation for AP SRS resources triggered by a AP trigger state. Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 3 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a trigger unit 32 which is configured to perform one or more network node 16 functions as described herein such as with respect to frequency allocation for AP SRS resources triggered by an AP trigger state, as described herein. A wireless device 22 is configured to include a RS unit 34 which is configured to perform one or more wireless device 22 functions as described herein such as with to respect to frequency allocation for AP SRS resources triggered by an AP trigger state, as described herein.

Example implementations, in accordance with an embodiment, of the WD 22, network node 16 and host computer 24 discussed in the preceding paragraphs will now be described with reference to FIG. 4. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to determine, process, store, transmit, receive, communicate, relay, forward, signal, etc., information related to frequency allocation for AP SRS resources triggered by an AP trigger state.

The communication system 10 further includes a network node 16 provided in a communication system 10 and includes hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include trigger unit 32 configured to perform one or more network node 16 functions as described herein such as with respect to frequency allocation for AP SRS resources triggered by an AP trigger state, as described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a RS unit 34 configured to perform one or more wireless device 22 functions such as with respect to frequency allocation for AP SRS resources triggered by an AP trigger state, as described herein.

Figure 4:
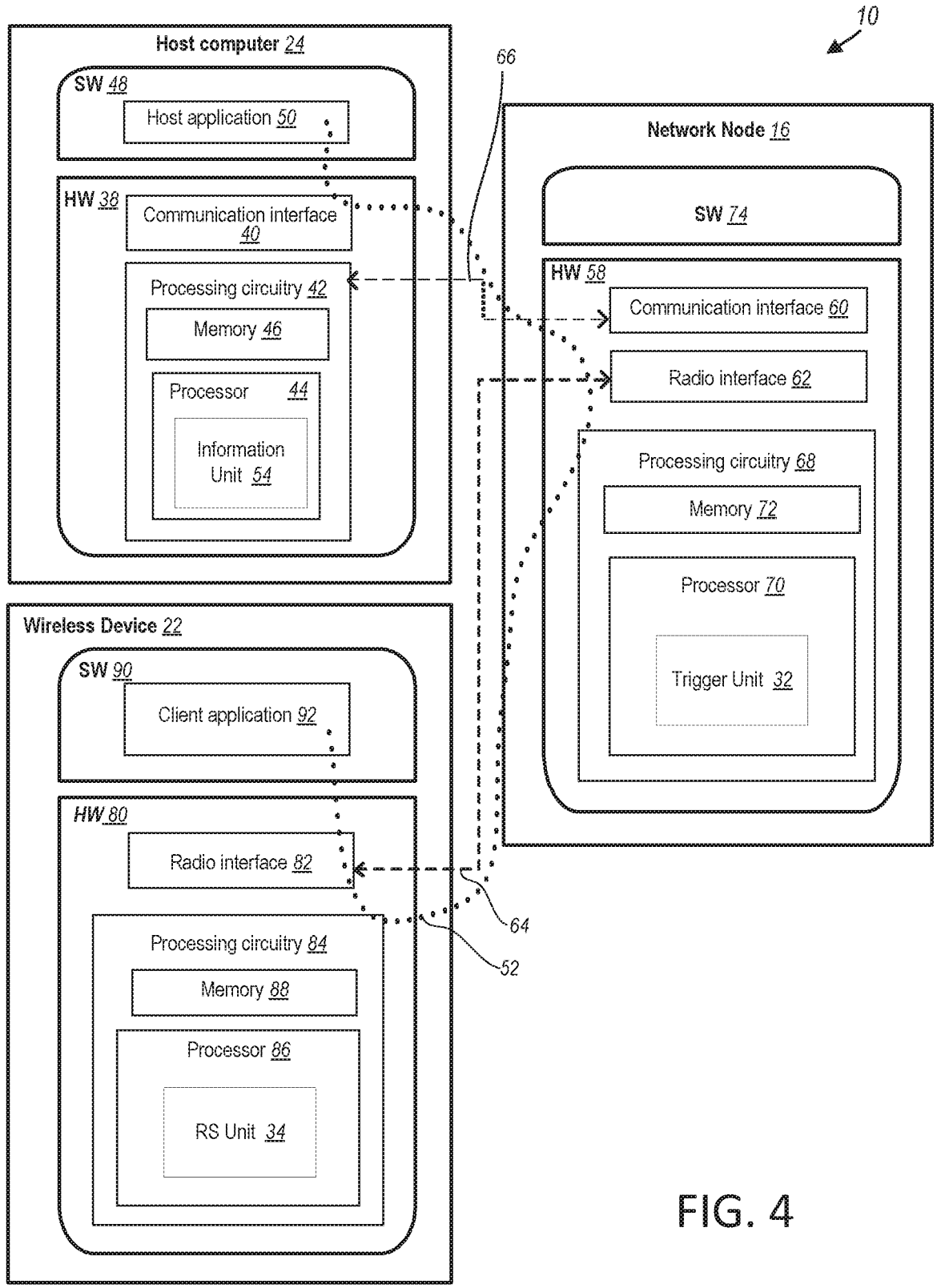
FIG. 4 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 4 and independently, the surrounding network topology may be that of FIG. 3.

In FIG. 4, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 3 and 4 show various "units" such as trigger unit 32, and RS unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 5 is a flowchart illustrating an example method implemented in a communication system, such as, for example, the communication system of FIGS. 3 and 4, in accordance with one embodiment. The communication system may include a host computer 24, a network node 16 and a WD 22, which may be those described with reference to FIG. 4. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 6 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 7, 8:
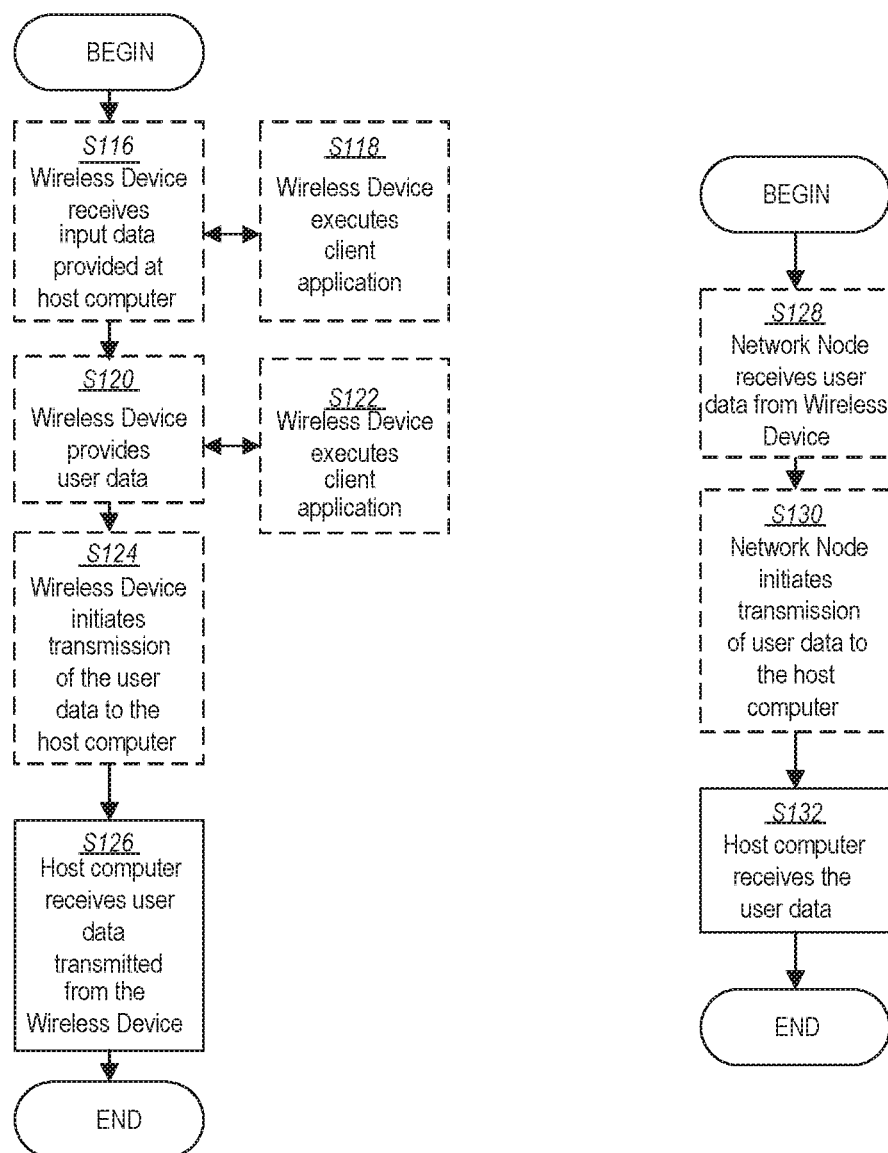
FIG. 7 is a flowchart illustrating example methods implemented in a communication system including a host computer, a network node and a wireless device for receiving user data from the wireless device at a host computer according to some embodiments of the present disclosure.
FIG. 8 is a flowchart illustrating example methods implemented in a communication system including a host computer, a network node and a wireless device for receiving user data at a host computer according to some embodiments of the present disclosure.

FIG. 7 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 8 is a flowchart illustrating an example method implemented in a communication system, such as, for example, the communication system of FIG. 3, in accordance with one embodiment. The communication system may include a host computer 24, a network node 16 and a WD 22, which may be those described with reference to FIGS. 3 and 4. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 9:
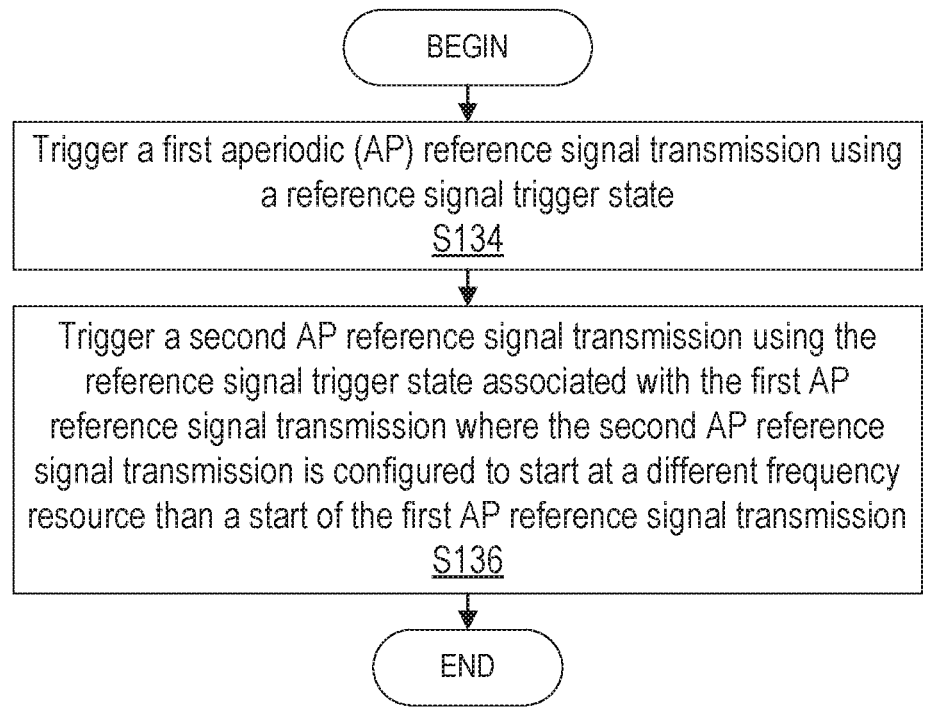
FIG. 9 is a flowchart of an example process in a network node according to some embodiments of the present disclosure.

FIG. 9 is a flowchart of an example process in a network node 16 according to some embodiments of the present disclosure. One or more Blocks and/or functions performed by network node 16 may be performed by one or more elements of network node 16 such as by trigger unit 32 in processing circuitry 68, processor 70, radio interface 62, etc. In one or more embodiments, network node 16 is configured to trigger (Block S134) a first aperiodic (AP) reference signal transmission using a reference signal trigger state, as described herein. In one or more embodiments, network node 16 is configured to trigger (Block S136) a second AP reference signal transmission using the reference signal trigger state associated with the first AP reference signal transmission where the second AP reference signal transmission is configured to start at a different frequency resource than a start of the first AP reference signal transmission, as described herein.

According to one or more embodiments, the first AP reference signal transmission is configured with frequency hopping across a first plurality of orthogonal frequency-division multiplexing, OFDM, symbols where the second AP reference signal transmission is configured with frequency hopping across a second plurality of OFDM symbols different from the first OFDM symbols. According to one or more embodiments, the second AP reference signal transmission starts at one of a consecutive and overlapping frequency resource to a frequency resource at an end of the first AP reference signal transmission.

Figure 10:
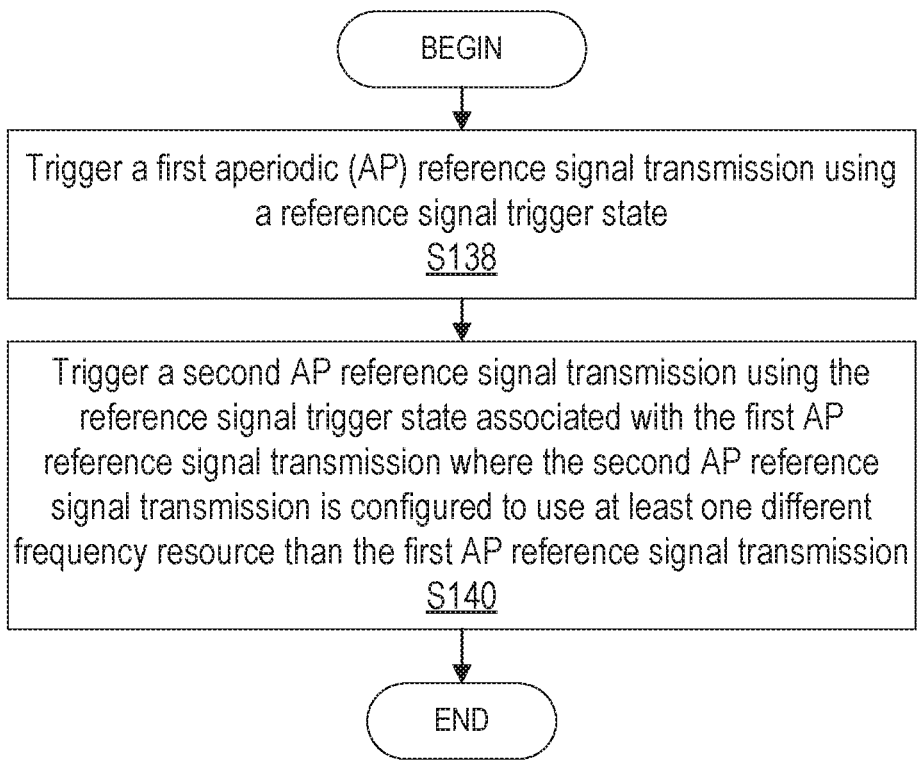
FIG. 10 is a flowchart of another example process in a network node according to some embodiments of the present disclosure.

FIG. 10 is a flowchart of another example process in a network node 16 according to some embodiments of the present disclosure. One or more Blocks and/or functions performed by network node 16 may be performed by one or more elements of network node 16 such as by trigger unit 32 in processing circuitry 68, processor 70, radio interface 62, etc. In one or more embodiments, network node 16 is configured to trigger (Block S138) a first aperiodic, AP, reference signal transmission using a reference signal trigger state, as described herein. Network node 16 is configured to trigger (Block S140) a second AP reference signal transmission using the reference signal trigger state associated with the first AP reference signal transmission where the second AP reference signal transmission is configured to use at least one different frequency resource than the first AP reference signal transmission, as described herein.

According to one or more embodiments, the second AP reference signal transmission is configured to start at a different frequency resource than a start of the first AP reference signal transmission. According to one or more embodiments, the second AP reference signal transmission is configured to use frequency resources that are contiguous with a frequency resources used for the first AP reference signal transmission. According to one or more embodiments, the second AP reference signal transmission is configured to use at least one frequency resources that is used by the first AP reference signal transmission.

According to one or more embodiments, the reference signal trigger state associated with at least the first and second AP reference signal transmissions is configured to use an entire preconfigured SRS bandwidth. According to one or more embodiments, respective frequency resources used by the first AP reference signal transmission and the second AP reference signal transmission are configured based at least on a frequency hopping equation that includes a frequency offset relative to a previous transmission. According to one or more embodiments, the first and second AP reference signal transmission are configured on one of: respective non-contiguous frequency resources; and respective contiguous frequency resource.

According to one or more embodiments, the first AP reference signal transmission and the second AP signal transmission are trigger by respective downlink control information, DCI, signaling. According to one or more embodiments, the triggering of the first and second AP reference signal transmission is based at least on radio resource control, RRC, signaling indicating a frequency hopping scheme for the first and second AP reference signal transmissions.

Figure 11:
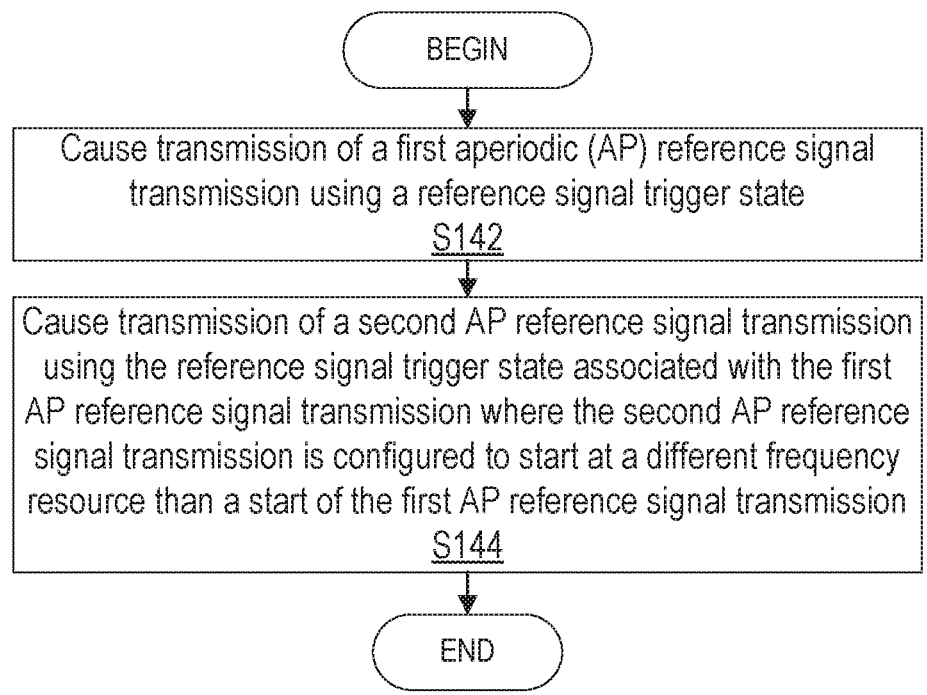
FIG. 11 is a flowchart of an example process in a wireless device according to some embodiments of the present disclosure.

FIG. 11 is a flowchart of an example process in a wireless device 22 according to some embodiments of the present disclosure. One or more Blocks and/or functions performed by wireless device 22 may be performed by one or more elements of wireless device 22 such as by RS unit 34 in processing circuitry 84, processor 86, radio interface 82, etc. In one or more embodiments, wireless device 22 is configured to cause (Block S142) transmission of a first aperiodic (AP) reference signal transmission using a reference signal trigger state, as described herein. In one or more embodiments, wireless device 22 is configured to cause (Block S144) transmission of a second AP reference signal transmission using the reference signal trigger state associated with the first AP reference signal transmission where the second AP reference signal transmission is configured to start at a different frequency resource than a start of the first AP reference signal transmission, as described herein.

According to one or more embodiments, the first AP reference signal transmission is configured with frequency hopping across a first plurality of orthogonal frequency-division multiplexing, OFDM, symbols where the second AP reference signal transmission is configured with frequency hopping across a second plurality of OFDM symbols different from the first OFDM symbols. According to one or more embodiments, the second AP reference signal transmission starts at one of a consecutive and overlapping frequency resource to a frequency resource at an end of the first AP reference signal transmission. According to one or more embodiments, the first and second AP reference signal transmission are associated with a reference signal trigger state.

Figure 12:
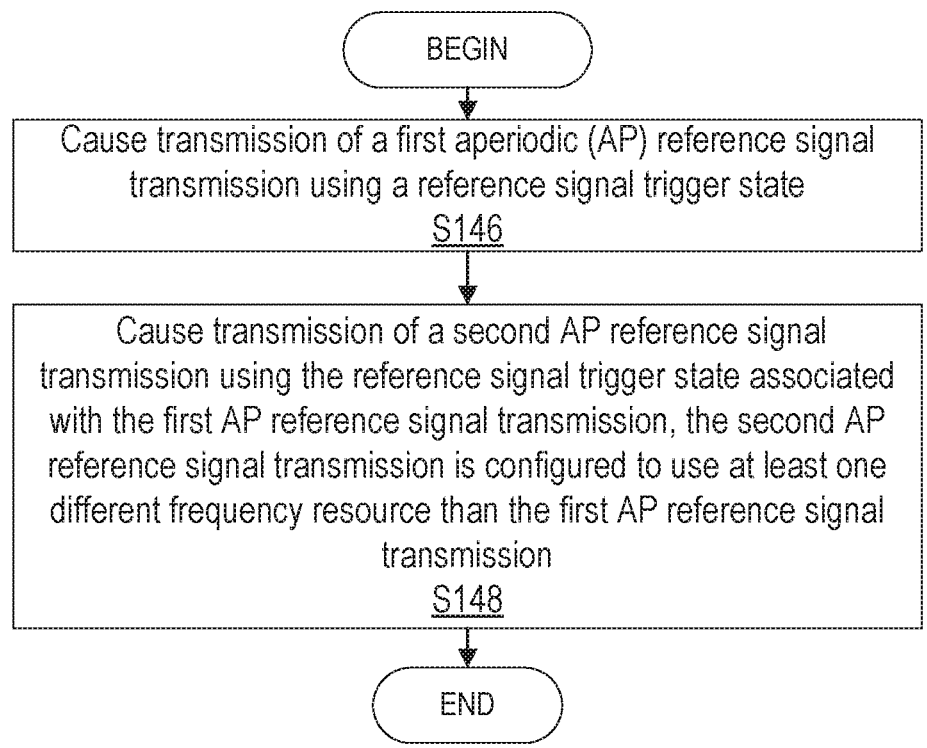
FIG. 12 is a flowchart of another example process in a wireless device according to some embodiments of the present disclosure.

FIG. 12 is a flowchart of another example process in a wireless device 22 according to some embodiments of the present disclosure. One or more Blocks and/or functions performed by wireless device 22 may be performed by one or more elements of wireless device 22 such as by RS unit 34 in processing circuitry 84, processor 86, radio interface 82, etc. In one or more embodiments, wireless device 22 is configured to cause (Block S146) transmission of a first aperiodic, AP, reference signal transmission using a reference signal trigger state, as described herein. Wireless device 22 is configured to cause (Block S148) transmission of a second AP reference signal transmission using the reference signal trigger state associated with the first AP reference signal transmission, the second AP reference signal transmission is configured to use at least one different frequency resource than the first AP reference signal transmission, as described herein.

According to one or more embodiments, the second AP reference signal transmission is configured to start at a different frequency resource than a start of the first AP reference signal transmission. According to one or more embodiments, the second AP reference signal transmission is configured to use frequency resources that are contiguous with a frequency resources used for the first AP reference signal transmission. According to one or more embodiments, the second AP reference signal transmission is configured to use at least one frequency resources that is used by the first AP reference signal transmission.

According to one or more embodiments, the reference signal trigger state associated with at least the first and second AP reference signal transmissions is configured to use an entire preconfigured SRS bandwidth. According to one or more embodiments, respective frequency resources used by the first AP reference signal transmission and the second AP reference signal transmission are configured based at least on a frequency hopping equation that includes a frequency offset relative to a previous transmission. According to one or more embodiments, the first and second AP reference signal transmission are configured on one of: respective non-contiguous frequency resources; and respective contiguous frequency resource.

According to one or more embodiments, the processing circuitry is further configured to receive a plurality instances of downlink control information, DCI, signaling, each instance of DCI signaling configured to trigger a respective AP signal transmission. According to one or more embodiments, the processing circuitry is further configured to receive radio resource control, RRC, signaling indicating a frequency hopping scheme for the first and second AP reference signal transmissions.

Having generally described arrangements for frequency allocation for AP SRS resources triggered by an AP trigger state, details for these arrangements, functions and processes are provided as follows, and which may be implemented by the network node 16, wireless device 22 and/or host computer 24.

Embodiments provide frequency allocation for AP SRS resources triggered by an AP trigger state. One or more network node 16 functions described below may be performed by one or more of processing circuitry 68, processor 70, trigger unit 32, radio interface 62, etc. One or more wireless device 22 functions described below may be performed by one or more of processing circuitry 84, processor 86, RS unit 34, radio interface 82, etc.

Figure 13:
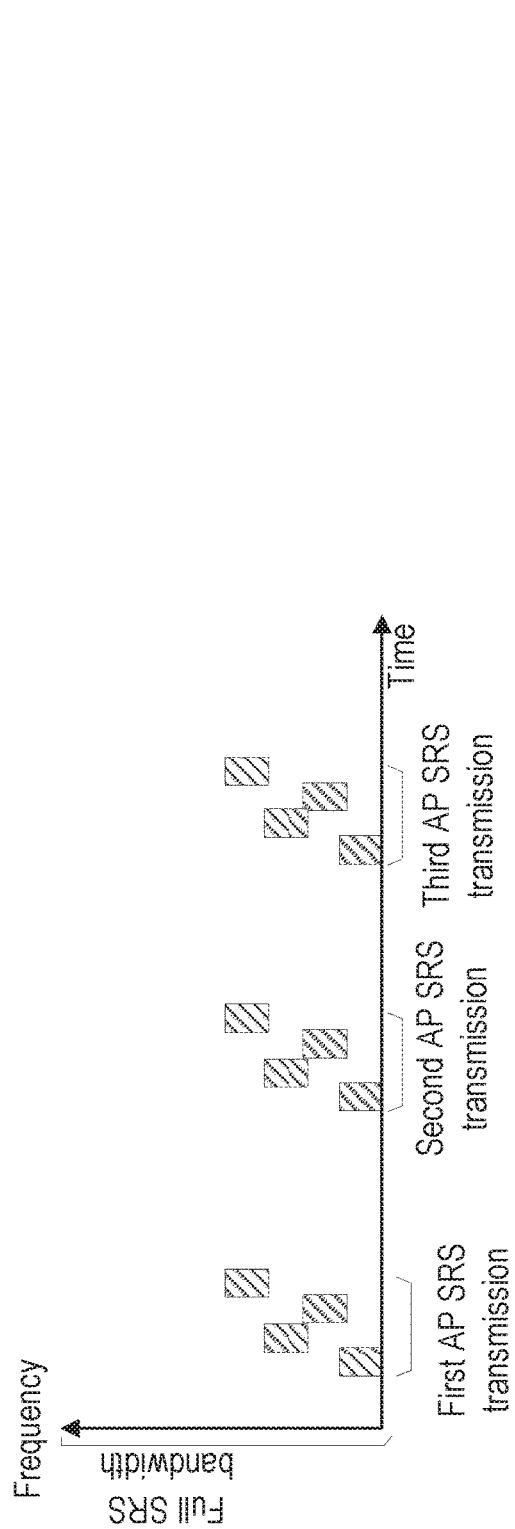
FIG. 13 is a diagram of an existing configuration for SRS transmission.
Figure 14:
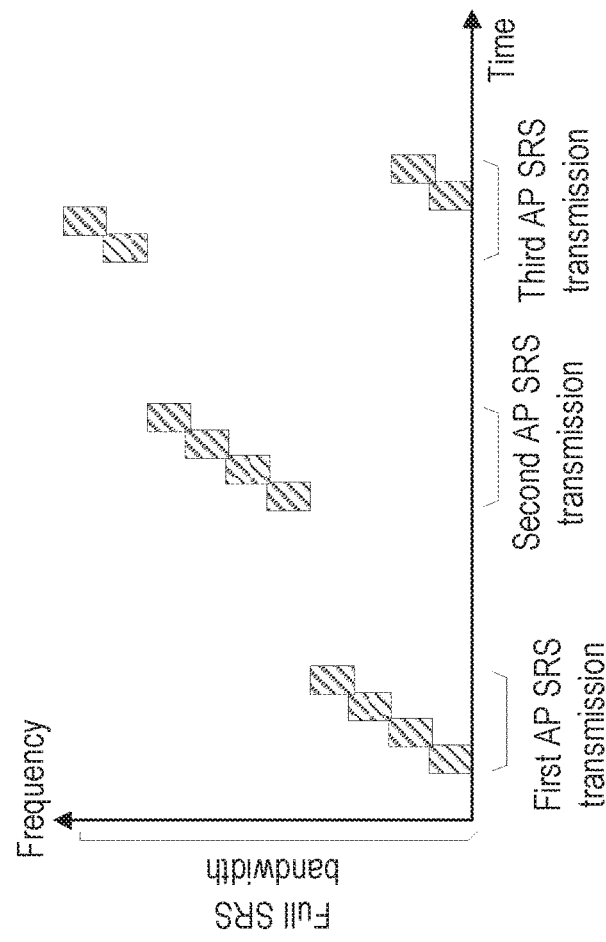
FIG. 14 is a diagram of a configuration for SRS transmission according to some embodiments of the present disclosure.

Referring to FIGS. 13-14, an example according to existing methods is shown in FIG. 13 (with a frequency-hopping pattern set according to existing wireless communication standards such as Section 6.4.1.4.3 of 3GPP TS 38.211 version 15.8), and a general concept of the disclosure is illustrated in FIG. 14. As illustrated in FIG. 14, the frequency band of an AP SRS transmission continues over the frequency band until the full SRS bandwidth has been sounded (i.e., covered by SRS), which differs from FIG. 13 where the same RBs are be triggered in each AP SRS transmissions if the same SRS trigger state is indicated in the DCI. The continued SRS transmission is illustrated in FIG. 14 can be achieved by one or more methods, as will be described in the different embodiments below.

Embodiment 1 (DCI Based)

In a first embodiment, the DCI configured and/or transmitted, such as by network node 16, triggers the AP SRS transmission contains an additional single-bit bitfield signaling a flag that indicates if the SRS transmission should start over from the beginning (i.e., beginning RB) or not (for the given indicated SRS trigger state).

For example, if indicated to not start over from the beginning, the SRS transmission, such as by wireless device 22, can continue from where it last ended (i.e., from where the preceding SRS transmission ended) as illustrated in FIG. 14 (continued transmission). There are several ways to accomplish this. Two examples of how to achieve this continued transmission are provided below.

In 3GPP NR Release 16, the frequency-domain starting position (measured in resource elements) of an SRS transmission on SRS port p is given by:

$$k_0^{(p)} = \bar{k}_{TC}^{(p)} + 12 \cdot n_{shift} + \Sigma_{b=0}^{B_{SRS}} K_{TC} M_{sc,b}^{SRS} n_b(n_{RRC}).$$

Here, $\bar{k}_{TC}^{(p)}$ is the transmission comb for SRS port p and $n_{shift}$ is the frequency-domain shift (configured by the RRC parameter freqDomainShift). Furthermore, the term $\Sigma_{b=0}^{B_{SRS}} K_{TC} M_{sc,b}^{SRS} n_b(n_{RRC})$ determines which part of the SRS hopping bandwidth is sounded by an SRS transmission within an OFDM symbol as described in existing communication standards such as in Section 6.4.1.4.3 of 3GPP TS 38.211. Here, $n_b(n_{RRC})$ denotes the frequency-position index that is a function of the quantity $n_{RRC}$ configured by the RRC parameter freqDomainPosition.

Continued transmission that retains and/or uses the frequency-hopping pattern used in existing wireless communication standards such as 3GPP Release 16 of NR may be used, for example, by modifying the formula above to include an offset Δ, where the offset Δ indicates where the SRS transmission should start from. The modified formula is as follows:

$$k_0^{(p)} = \bar{k}_{TC}^{(p)} + 12 \cdot n_{shift} + \Sigma_{b=0}^{B_{SRS}} K_{TC} M_{sc,b}^{SRS} n_b(n_{RRC} + \Delta/4).$$

In particular, an offset $\Delta = K \cdot m_{SRS,b\text{-}hop}$ (measured in RBs) is introduced, where $m_{SRS,b\text{-}hop} \leq m_{SRS,0}$ is the SRS hopping bandwidth (measured in RBs), $m_{SRS,0}$ is the full SRS bandwidth (measured in RBs) and K is an nonnegative integer. This offset Δ may alternatively be incorporated directly in the variable $n_{RRC}$ that may be configured and/or transmitted by the network node 16.

With the frequency-hopping pattern used, for example, in 3GPP NR Release 16, the modification above may result in the full SRS bandwidth being sounded, for example, only if the following two criteria are satisfied:

The full SRS bandwidth $m_{SRS,0}$ (configured by the RRC parameter c-SRS) is an integer multiple of the SRS hopping bandwidth $m_{SRS,b\text{-}hop}$ (configured by the RRC parameter b-hop). In wireless communication standards such as 3GPP Release 16 of NR, this is guaranteed as indicated in Table 6.4.1.4.3 in 3GPP TS 38.211. In the example shown in FIG. 14, this integer multiple concept may not hold or be satisfied.

The entirety of the SRS hopping bandwidth is sounded within each slot (configured through the RRC parameters b-hop, b-SRS, nrofSymbols and repetitionFactor). This holds (i.e., is satisfied) in the example shown in FIG. 14 as a continuous frequency range is sounded in each slot (i.e., in every AP SRS transmission).

Referring to FIG. 15, an example of continued transmission, such as by wireless device 22, in which the two criteria above are fulfilled is provided. In FIG. 15, the entirety of the SRS hopping bandwidth is sounded in an AP SRS transmission. In FIG. 16, an example in which the first criterion is satisfied but the second criterium is not (i.e., when the entirety of the SRS hopping bandwidth is not sounded within each slot) is shown. In FIG. 16, the entirety of the full SRS bandwidth is not sounded in an AP SRS transmission.

To achieve sounding using continued transmission as in the example of FIG. 14 (i.e., without adhering to the two criteria above and to the frequency-hopping pattern used in 3GPP Release 16), the frequency-domain starting position of an SRS transmission on SRS port p could, for example, instead be given as follows:

$$k_0^{(p)} = \bar{k}_{TC}^{(p)} + 12 \cdot n_{shift} + \mathrm{mod}(12 \cdot \Delta + 48 \cdot n_{RRC} + 12 \cdot n_{SRS} \cdot m_{SRS,b\text{-}SRS}, 12 \cdot m_{SRS,0}).$$

Here, $m_{SRS, b\text{-}SRS} \le m_{SRS,b\text{-}hop} \le m_{SRS,0}$ is the SRS bandwidth per hop (measured in RBs) and $n_{SRS}$ counts the number of SRS transmissions. Here, $m_{SRS,b\text{-}SRS} \cdot N_{symb}^{SRS} / R = m_{SRS,b\text{-}hop}$ (where $N_{symb}^{SRS}$ is the number of number of SRS symbols per slot (configured by the RRC parameter nrofSymbols and R is the number of repetitions (configured by the RRC parameter repetitionFactor)) and that $m_{SRS,0}$ is an integer multiple of $m_{SRS,b\text{-}SRS}$.

Alternatively, in one or more embodiments, the SRS transmission continues, such as by wireless device 22, but this transmission does not start at the same RB as in the previous trigger of the same trigger state, this transmission is adjusted with an offset of $\Delta$ (for which it may not hold (i.e., satisfy) that $\Delta = K \cdot m_{SRS,b\text{-}hop}$, where K is a nonnegative integer) relative to the previous transmission (staggered transmission), in order for the second transmission to cover a new frequency band within the SRS bandwidth that was not covered by the transmissions from the previous trigger. The value of $\Delta$ can be configured by higher layers (i.e., by RRC) or specified in the wireless communication standard based on the teachings herein such that the wireless device 22 may be preconfigured with one or more values of offset $\Delta$. FIGS. 15-16 provide examples where $\Delta=3$.

If $\Delta$ is equal to the SRS bandwidth of a hop (as in the two previous examples of continuous transmission), then continuous operation and staggered operation are equivalent.

Alternatively, in one or more embodiments, a new bit is not added, but a DCI codepoint (i.e., a combination of multiple DCI fields is set in a pre-determined and specified manner to indicate that the flag is "set to "1".)

In yet another alternative, a new bit is not added, but the information as whether to not restart every time the trigger state is indicated is configured and associated with each SRS trigger state that may be configured by the network node 16. This information may indicate whether AP SRS transmission may restart at the same RB every time this state is triggered, where not restarting at the same RB may follow the procedure described above, e.g., staggered operation or continued operation). Hence, some SRS trigger state(s) may be configured, such as by network node 16, to use the new behavior while some other SRS trigger state(s) may use the legacy behavior where the starting RB using legacy behavior is the same every time the state is used.

Figure 17:
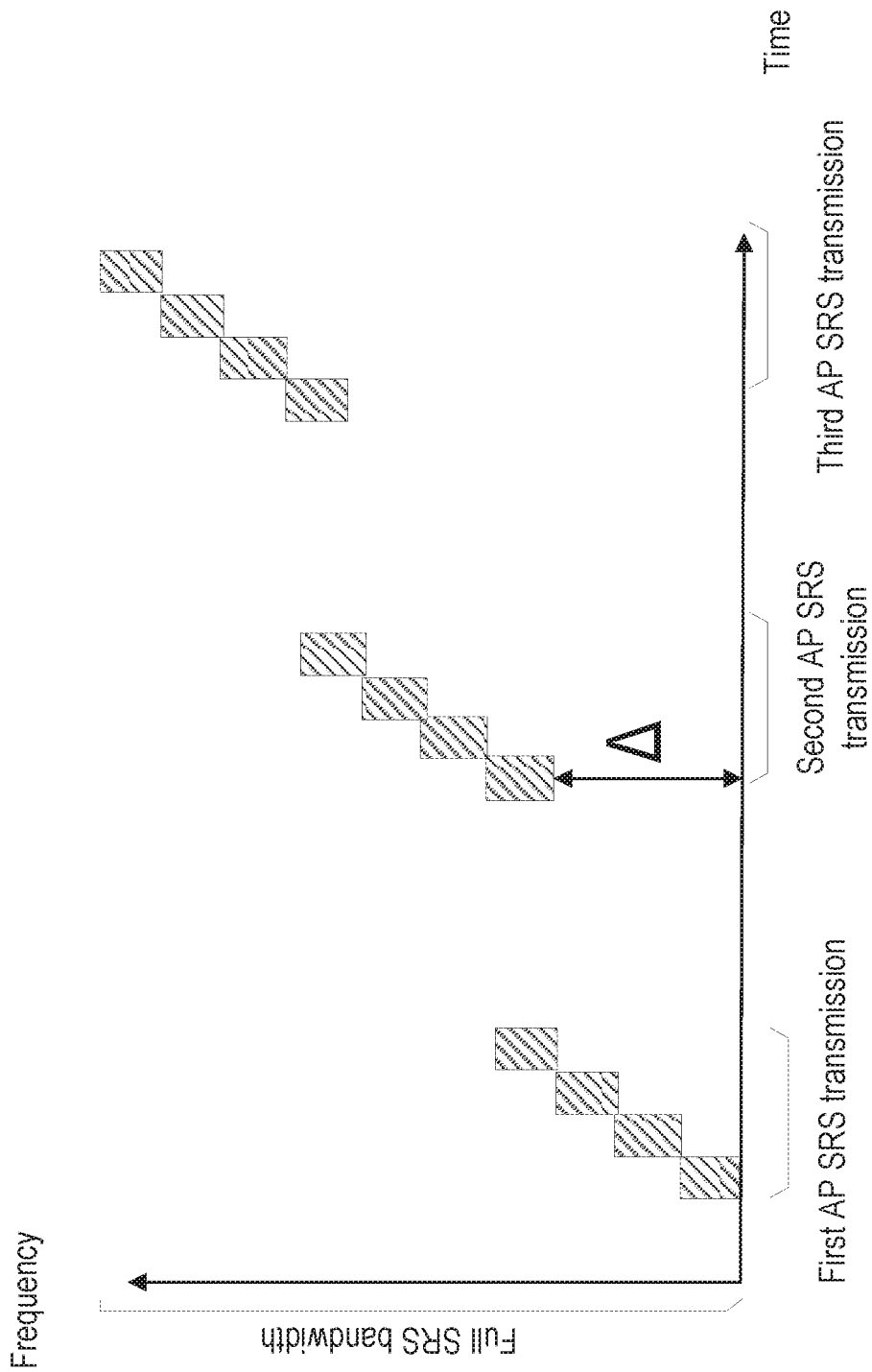
FIG. 17 is a diagram one example of SRS transmissions that cover the SRS bandwidth according to some embodiments of the present disclosure.

In an alternative embodiment, if the previous SRS transmission of a trigger state has reached the SRS bandwidth (which may be possible using wrap-around to the first RB again as third transmission in FIG. 17 where the third AP SRS transmission corresponds to the third trigger), then the next transmission (fourth trigger in the example in FIG. 17), would restart from the original position (e.g., corresponding to the first trigger (i.e., first AP SRS transmission) in the example of FIG. 17).

Figure 18:
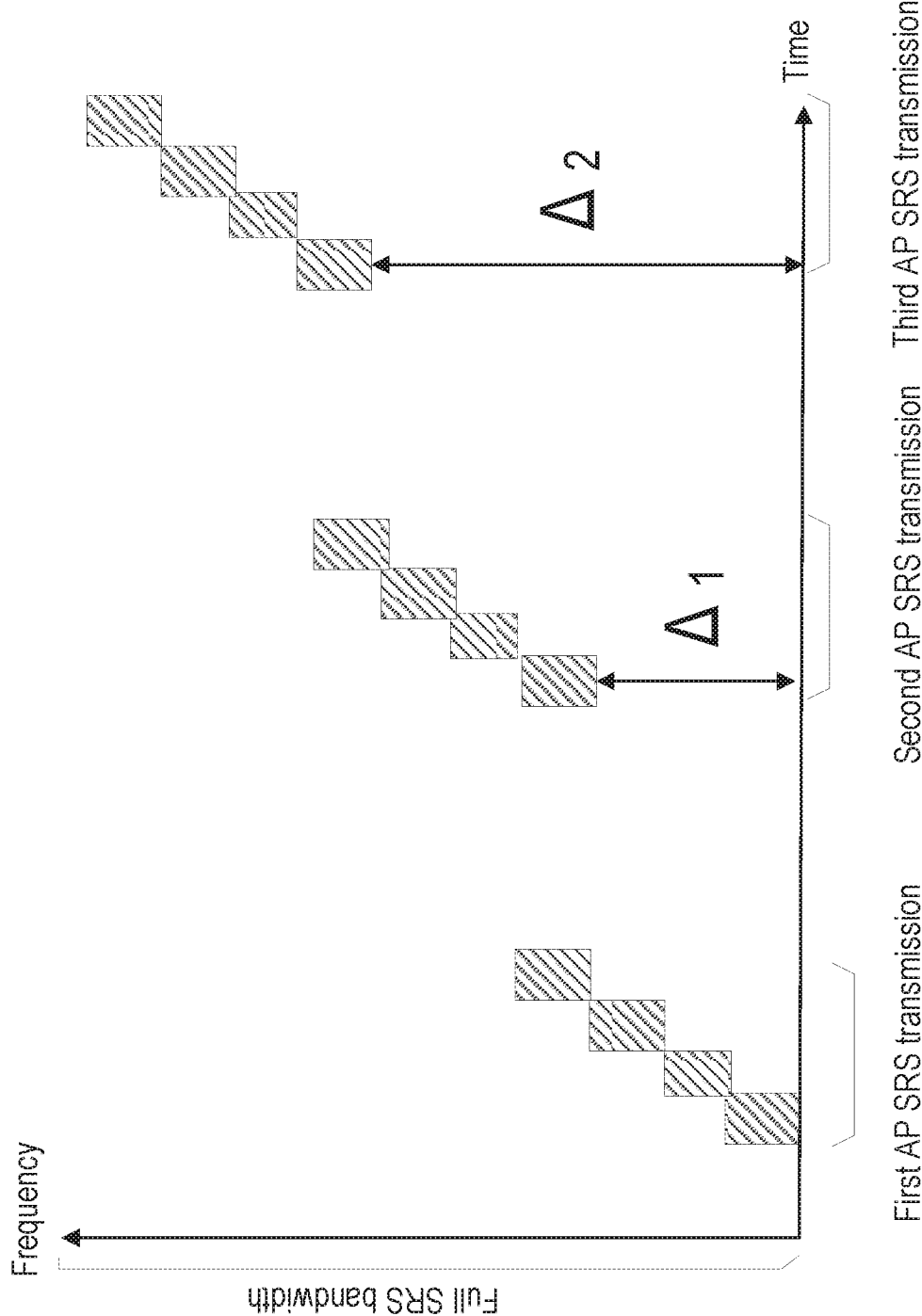
FIG. 18 is a diagram of another example of SRS transmissions that cover the SRS bandwidth according to some embodiments of the present disclosure.

In yet another embodiment, the DCI contains multi-state information (equivalent to more than one bit) to indicate the offset $\Delta$. For example, a two-bit field (or four DCI codepoints) could be used to indicate one of four possible $\Delta$ offsets. FIG. 18 illustrates an example where the DCI contains multi-state information such as $\Delta_1$ and $\Delta_2$.

Embodiment 2 (RRC Configuration)

In a second embodiment, the AP SRS set is RRC configured with an additional bit field, as illustrated in FIG. 19. When the wireless device 22 is triggered with an AP SRS set that has the field "full-band-frequency-hopping" set to "true," the wireless device 22 may apply one of the frequency-hopping schemes as described in any one of the different embodiments and/or examples above.

In another example of this embodiment, multiple bitfield(s) and/or a bitfield with more options and/or configurations can be used to select one of the multiple different frequency-hopping methods described above.

Additional Embodiment(s) and/or Example(s)

A new capability for wireless device 22 is suitable for introduction in 3GPP NR Release 17 that describes the wireless device 22's ability to maintain the phase (and possibly amplitude) of two signals transmitted in different slots. As used herein, a capability to maintain phase coherence in different slots as cross-time coherence. If a wireless device 22 is capable of cross-time coherence, the receiver (i.e., the network node 16) can directly combine the channel estimates from an SRS resource transmitted in a first frequency band in one slot, and in a second frequency band in a second slot and determine a channel estimate over the full frequency bandwidth.

In this case, even if the wireless device 22 is configured/triggered to continue sounding (i.e., transmitting the sound reference signal) in the remaining bandwidth, the wireless device 22 may only do so as long as the two SRS transmissions are within a certain time interval of each other. In one example of this embodiment, the time interval is similar to the cross-time coherence specification signaled in wireless device 22 capability of the wireless device 22.

Examples

Example A1. A network node 16 configured to communicate with a wireless device 22, the network node 16 configured to, and/or comprising a radio interface 62 and/or comprising processing circuitry 68 configured to:
 trigger a first aperiodic, AP, reference signal transmission using a reference signal trigger state; and trigger a second AP reference signal transmission using the reference signal trigger state associated with the first AP reference signal transmission, the second AP reference signal transmission is configured to start at a different frequency resource than a start of the first AP reference signal transmission.

Example A2. The network node 16 of Example A1, wherein the first AP reference signal transmission is configured with frequency hopping across a first plurality of orthogonal frequency-division multiplexing, OFDM, symbols; and 'the second AP reference signal transmission is configured with frequency hopping across a second plurality of OFDM symbols different from the first OFDM symbols.

Example A3. The network node of Example A1, wherein the second AP reference signal transmission starts at one of a consecutive and overlapping frequency resource to a frequency resource at an end of the first AP reference signal transmission.

Example B1. A method implemented in a network node 16 that is configured to communicate with a wireless device 22, the method comprising:
  triggering a first aperiodic, AP, reference signal transmission using a reference signal trigger state; and
  triggering a second AP reference signal transmission using the reference signal trigger state associated with the first AP reference signal transmission, the second AP reference signal transmission is configured to start at a different frequency resource than a start of the first AP reference signal transmission.

Example B2. The method of Example B1, wherein the first AP reference signal transmission is configured with frequency hopping across a first plurality of orthogonal frequency-division multiplexing, OFDM, symbols; and
  the second AP reference signal transmission is configured with frequency hopping across a second plurality of OFDM symbols different from the first OFDM symbols.

Example B3. The method of Example B1, wherein the second AP reference signal transmission starts at one of a consecutive and overlapping frequency resource to a frequency resource at an end of the first AP reference signal transmission.

Example C1. A wireless device 22 configured to communicate with a network node 16, the wireless device 22 configured to, and/or comprising a radio interface 62 and/or processing circuitry 68 configured to:
  cause transmission of a first aperiodic, AP, reference signal transmission using a reference signal trigger state; and
  cause transmission of a second AP reference signal transmission using the reference signal trigger state associated with the first AP reference signal transmission, the second AP reference signal transmission is configured to start at a different frequency resource than a start of the first AP reference signal transmission.

Example C2. The wireless device 22 of Example C1, wherein the first AP reference signal transmission is configured with frequency hopping across a first plurality of orthogonal frequency-division multiplexing, OFDM, symbols; and
  the second AP reference signal transmission is configured with frequency hopping across a second plurality of OFDM symbols different from the first OFDM symbols.

Example C3. The wireless device 22 of Example C1, wherein the second AP reference signal transmission starts at one of a consecutive and overlapping frequency resource to a frequency resource at an end of the first AP reference signal transmission.

Example C4. The wireless device 22 of Examples C1, wherein the first and second AP reference signal transmission are associated with a reference signal trigger state.

Example D1. A method implemented in a wireless device 22 that is configured to communicate with a network node 16, the method comprising:
  causing transmission of a first aperiodic, AP, reference signal transmission using a reference signal trigger state; and
  causing transmission of a second AP reference signal transmission using the reference signal trigger state associated with the first AP reference signal transmission, the second AP reference signal transmission is configured to start at a different frequency resource than a start of the first AP reference signal transmission.

Example D2. The method of Example D1, wherein the first AP reference signal transmission is configured with frequency hopping across a first plurality of orthogonal frequency-division multiplexing, OFDM, symbols; and
  the second AP reference signal transmission is configured with frequency hopping across a second plurality of OFDM symbols different from the first OFDM symbols.

Example D3. The method of Example D1, wherein the second AP reference signal transmission starts at one of a consecutive and overlapping frequency resource to a frequency resource at an end of the first AP reference signal transmission.

Example D4. The method of Example D1, wherein the first and second AP reference signal transmission are associated with a reference signal trigger state.

Therefore, one or more embodiments of the instant disclosure provide a framework that enables a more flexible frequency allocation for AP SRS resources triggered by the same AP trigger state as compared with other arrangements.

Therefore, the teachings of the instant disclosure provide for the use of a larger number of different frequency-hopping sub-band bandwidths for AP SRS transmission while still attaining channel estimates for the full SRS sounding bandwidth. This allows for the full SRS bandwidth to be sounded by using a single SRS trigger state, thereby saving SRS trigger states compared to legacy operation.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that May be Used in the Preceding Description Include:
  3GPP Third Generation Partnership Project
  ASN Abstract Syntax Notation
  CE Control Element
  CSI Channel State Information
  CSI-RS Channel State Information Reference Signal
  DCI Downlink Control Information
  DL Downlink
  FR2 Frequency Range 2
  gNB gNodeB
  LTE Long Term Evolution
  MAC Medium Access Control
  MIMO Multiple-Input Multiple-Output
  MCS Modulation and Coding Scheme
  NR New Radio
  OFDM Orthogonal Frequency-Division Multiplexing
  PC Power Control
  PDCCH Physical Downlink Control Channel
  PSD Power Spectral Density
  PUSCH Physical Uplink Shared Channel
  RB Resource Block
  RRC Radio Resource Control
  RS Reference Signal
  RSRP Reference Signal Received Power
  SRS Sounding Reference Signal
  SSB Synchronization Signal Block
  UE User Equipment
  UL Uplink It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node configured to communicate with a wireless device, the network node comprising:
   processing circuitry configured to:
      trigger a first aperiodic, AP, reference signal transmission using a reference signal trigger state; and
      trigger a second AP reference signal transmission using the reference signal trigger state associated with the first AP reference signal transmission, the second AP reference signal transmission being configured to use at least one different frequency resource than the first AP reference signal transmission, the second AP reference signal transmission being configured to start at a different frequency resource than a start of the first AP reference signal transmission, the second AP reference signal transmission being configured to use frequency resources that are contiguous with frequency resources used for the first AP reference signal transmission; the second AP reference signal transmission being configured to use at least one frequency resource that is used by the first AP reference signal transmission.

2. The network node of claim 1, wherein the reference signal trigger state associated with at least the first and second AP reference signal transmissions is configured to use an entire preconfigured SRS bandwidth.

3. The network node of claim 1, wherein respective frequency resources used by the first AP reference signal transmission and the second AP reference signal transmission are configured based at least on a frequency hopping equation that includes a frequency offset relative to a previous transmission.

4. The network node of claim 1, wherein the first and second AP reference signal transmissions are configured on one of:
respective non-contiguous frequency resources; and
respective contiguous frequency resource.

5. The network node of claim 1, wherein the first AP reference signal transmission and the second AP signal transmission are trigger by respective downlink control information, DCI, signaling.

6. The network node of claim 1, wherein the triggering of the first and second AP reference signal transmissions is based at least on radio resource control, RRC, signaling indicating a frequency hopping scheme for the first and second AP reference signal transmissions.

7. A wireless device configured to communicate with a network node, the wireless device comprising:
processing circuitry configured to:
cause transmission of a first aperiodic, AP, reference signal transmission using a reference signal trigger state; and
cause transmission of a second AP reference signal transmission using the reference signal trigger state associated with the first AP reference signal transmission, the second AP reference signal transmission being configured to use at least one different frequency resource than the first AP reference signal transmission, the second AP reference signal transmission being configured to start at a different frequency resource than a start of the first AP reference signal transmission, the second AP reference signal transmission being configured to use frequency resources that are contiguous with frequency resources used for the first AP reference signal transmission; the second AP reference signal transmission being configured to use at least one frequency resource that is used by the first AP reference signal transmission.

8. The wireless device of claim 7, wherein the reference signal trigger state associated with at least the first and second AP reference signal transmissions is configured to use an entire preconfigured SRS bandwidth.

9. The wireless device of claim 7, wherein respective frequency resources used by the first AP reference signal transmission and the second AP reference signal transmission are configured based at least on a frequency hopping equation that includes a frequency offset relative to a previous transmission.

10. The wireless device of claim 7, wherein the first and second AP reference signal transmissions are configured on one of:
respective non-contiguous frequency resources; and
respective contiguous frequency resource.

11. The wireless device of claim 7, wherein the processing circuitry is further configured to receive a plurality instances of downlink control information, DCI, signaling, each instance of the plurality instances of the DCI signaling configured to trigger a respective AP signal transmission.

12. The wireless device of claim 7, wherein the processing circuitry is further configured to receive radio resource control, RRC, signaling indicating a frequency hopping scheme for the first and second AP reference signal transmissions.

13. A method implemented by a network node that is configured to communicate with a wireless device, the method comprising:
triggering a first aperiodic, AP, reference signal transmission using a reference signal trigger state; and
triggering a second AP reference signal transmission using the reference signal trigger state associated with the first AP reference signal transmission, the second AP reference signal transmission being configured to use at least one different frequency resource than the first AP reference signal transmission, the second AP reference signal transmission being configured to start at a different frequency resource than a start of the first AP reference signal transmission, the second AP reference signal transmission being configured to use frequency resources that are contiguous with frequency resources used for the first AP reference signal transmission; the second AP reference signal transmission being configured to use at least one frequency resource that is used by the first AP reference signal transmission.

14. The method of claim 13, wherein the reference signal trigger state associated with at least the first and second AP reference signal transmissions is configured to use an entire preconfigured SRS bandwidth.

15. A method implemented by a wireless device that is configured to communicate with a network node, the method comprising:
causing transmission of a first aperiodic, AP, reference signal transmission using a reference signal trigger state; and
causing transmission of a second AP reference signal transmission using the reference signal trigger state associated with the first AP reference signal transmission, the second AP reference signal transmission being configured to use at least one different frequency resource than the first AP reference signal transmission, the second AP reference signal being configured to start at a different frequency resource than a start of the first AP reference signal transmission, the second AP reference signal transmission being configured to use frequency resources that are contiguous with frequency resources used for the first AP reference signal transmission; the second AP reference signal transmission being configured to use at least one frequency resource that is used by the first AP reference signal transmission.

16. The method of claim 15, wherein the reference signal trigger state associated with at least the first and second AP reference signal transmissions is configured to use an entire preconfigured SRS bandwidth.

* * * * *